April 17, 1951 E. WENNERBO 2,549,272

RECORD CHANGING PHONOGRAPH

Filed May 7, 1946 2 Sheets-Sheet 1

INVENTOR
ERIK WENNERBO
BY Young, Emery & Thompson
ATTYS.

April 17, 1951 E. WENNERBO 2,549,272

RECORD CHANGING PHONOGRAPH

Filed May 7, 1946 2 Sheets-Sheet 2

INVENTOR
ERIK WENNERBO
BY Young, Emery & Thompson
ATTYS-

Patented Apr. 17, 1951 2,549,272

UNITED STATES PATENT OFFICE 2,549,272

RECORD CHANGING PHONOGRAPH

Erik Wennerbo, Motala, Sweden, assignor to Industriaktiebolaget Luxor, Motala, Sweden, a corporation of Sweden Application May 7, 1946, Serial No. 667,935
In Sweden November 3, 1944

Section 1, Public Law 690, August 8, 1946
Patent expires November 3, 1964

5 Claims. (Cl. 274—10)

The present invention relates to record changing gramophones provided with a turntable which is adapted to receive the records to be played and wherein the change of records is effected either by placing a new record upon those already present on the turntable, or by removing the uppermost record from a pile of records which is initially placed upon said turntable so that the level of the record to be played will vary during the playing of series of records.

One object of this invention is to provide a mechanism for automatically adjusting the angle between the reproducing needle of the tone arm and the record to be played so that this angle will always remain substantially constant regardless of the height of the pile of records resting on the turntable. Such a mechanism avoids the use of long reproducing needles having a great mass which would impair the sound quality and is of particular importance in connection with reproducing needles of sapphire and other precious stones which project very slightly from the underside of the pick-up.

Another object of the invention is to provide a mechanism whereby the angle between the reproducing needle and the record to be played will always be adjusted to a value giving the best compromise between record wear and sound quality, and whereby furthermore the wear of the reproducing needle always occurs at a predetermined angle.

These and other objects will become apparent from the following description read in conjunction with the accompanying drawings, in which—

Figure 1:
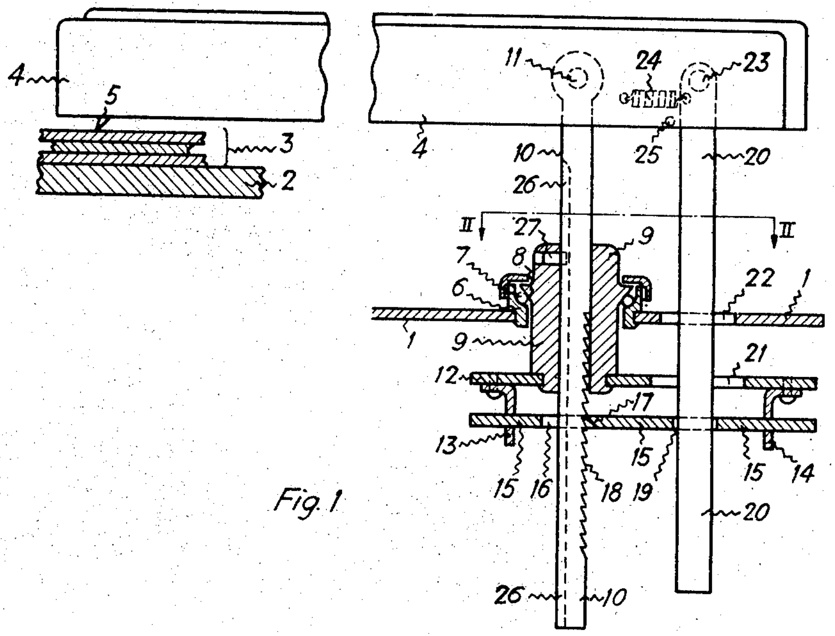
Fig. 1 is a side elevation, partly in section, of a first embodiment of the mechanism according to the invention.
Figure 2:
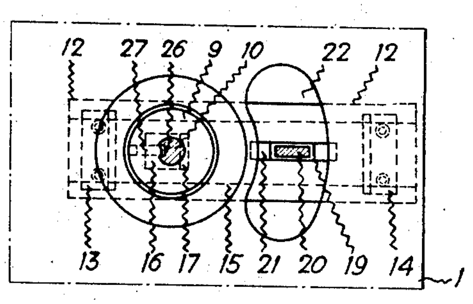
Fig. 2 is a horizontal section taken on line II—II, Fig. 1.
Figures 3, 4, 5, 6, 7, 8:
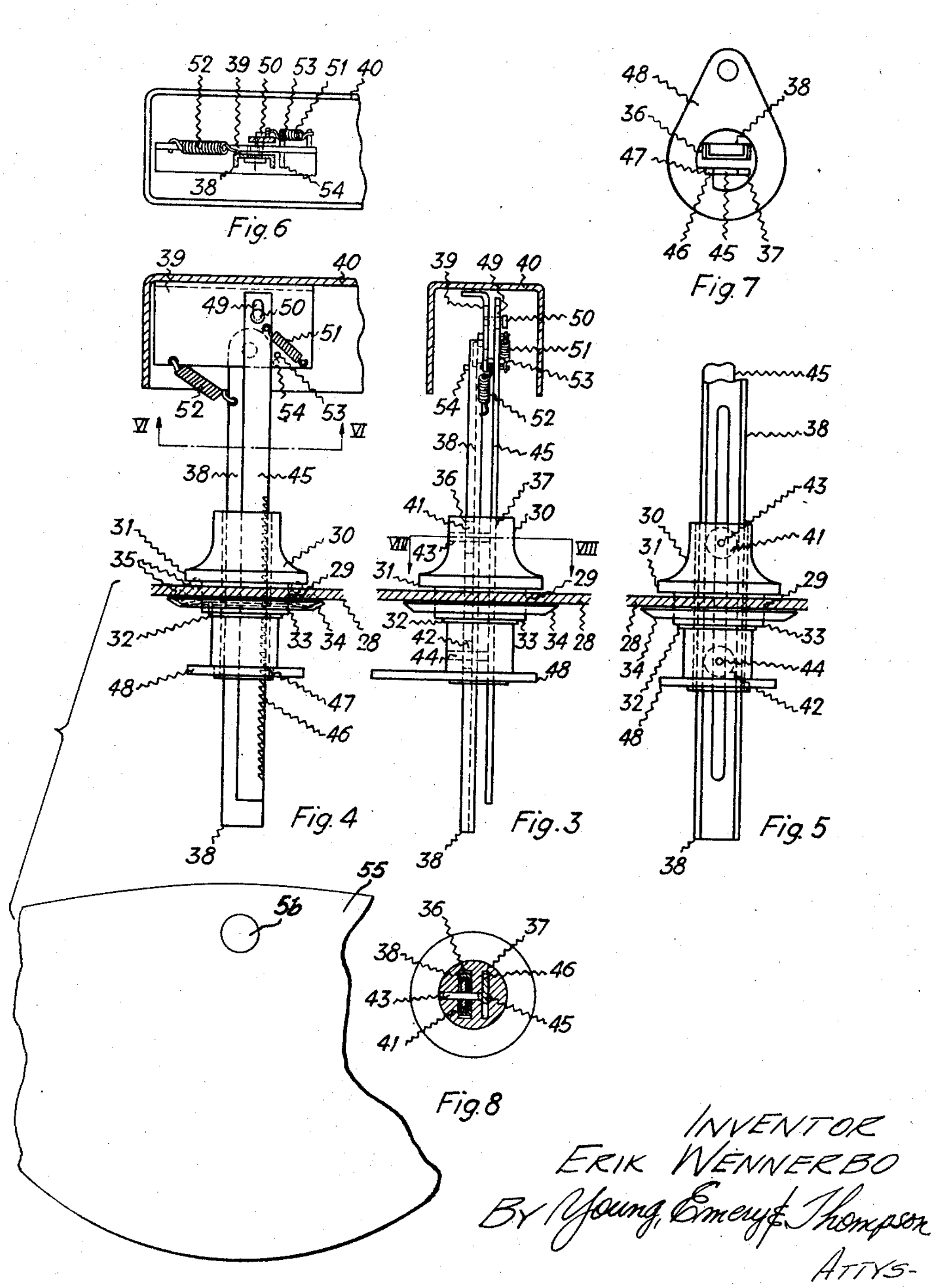
Fig. 3 is a rear elevation, partly in section, of a second embodiment of the mechanism according to the invention.
Fig. 4 is an elevation, partly in section, looking from the left hand side of Fig. 3.
Fig. 5 is a fragmentary elevation looking from the right hand side of Fig. 3.
Fig. 6 is a horizontal section on line VI—VI, Fig. 4.
Fig. 7 is a bottom plan view of the mechanism according to the Fig. 3.
Fig. 8 is a horizontal section on line VIII—VIII, Fig. 3.

In Figs. 1 and 2 reference numeral 1 designates a base plate upon which the various parts of the gramophone are mounted, and 2 is a turntable upon which rests a pile of records 3, this pile being shown as comprising three records. Reference numeral 4 designates a tone arm 4 which at its left hand end is provided with a pick-up the needle of which is shown at 5.

In a bore in the base plate 1 a cup-shaped ball-race 6 is mounted containing a row of balls 7 upon which rests a sleeve 9 by means of a conical flange 8. Through the sleeve 9 a vertical rod 10 extends which at its upper end is pivotally mounted on a pin 11 secured to the tone arm 4. The pin 11 forms the horizontal bearing and the balls 7 form the vertical bearing of the tone arm 4. The rod 10 has a longitudinal groove 26 which is engaged by a pin 27 secured to the sleeve 9 so that the rod 10 is prevented from turning in said sleeve.

To the lower end of the sleeve 9 a plate 12 is secured which carries two slotted brackets 13 and 14 serving as guides for a longitudinally movable horizontal rod 15. In the rod 15 a rectangular aperture 16 is provided through which the rod 10 extends. The right hand edge of the aperture 16 is bevelled so as to form a tooth 17 adapted to cooperate with the teeth of a toothed portion 18 of the vertical rod 10. In the horizontal rod 15 a further aperture 19 is also provided through which a vertical rod 20 extends. This rod 20 also passes through a slot 21 in the plate 12 and through a kidney-shaped aperture 22 in the base plate 1. The upper end of the rod 20 is pivotally mounted on a pin 23 which is secured to the tone arm 4. A coiled tension spring 24 having its ends secured to the rod 20 and to the tone arm 4, respectively, tends to turn this rod clockwise about the axis 23. A stop pin 25 secured to the tone arm 4 serves to limit the turning movement of the rod 20 about the axis 23 as will be described later.

The operation of this device is as follows.

Fig. 1 shows the position of the various parts of the mechanism while a record is being played, the spring 24 keeping the tooth 17 of the rod 15 in engagement with one of the teeth 18 of the tone arm supporting member or rod 10 through the intermediary of the rod 20 so that the rod 10 cannot move downwardly but is held at a level giving a suitable angle between the reproducing needle 5 and the record being played.

When the playing of the record has been concluded a record changing operation is started in a manner known per se. A cam disc 55, Fig. 9, or other suitable means mounted on a shaft 5b actuates the lower end of the rod 10 and moves the same upwardly which is possible due to the particular shape of the teeth 18. During the first part of this upward movement of the rod 10 the pick-up needle 5 remains on the record by gravity so that only at the right hand end of the tone arm 4 is elevated. The tone arm 4 is thus turned counterclockwise about the axis 11 with respect to the rod 10. Owing to the spring 24 and the plate 15 the rods 10 and 20 are kept substantially parallel, however, so that the tone arm 4 is also turned counterclockwise about the axis 23 with respect to the rod 20. When this turning movement has continued for some time the stop pin 25 engages the rod 20 whereupon further turning movement of the tone arm counterclockwise about the axis 23 is prevented. Upon further upward movement of the rod 10 the rod 20 and the tone arm 4 are thus turned as a unit about the axis 11. This causes the lower end of the rod 20 and hence the rod 15 to be moved to the right so that the tooth 17 is moved out of engagement with the toothed portion 18 of the rod 10 and instead the left hand edge of the aperture 16 in the rod 15 engages the rod 10. When this phase of the operation has been reached further turning movement of the tone arm 4 counterclockwise about the axis 11 with respect to the rod 10 is prevented.

Upon continued elevation of the rod 10 this rod and the tone arm 4 are raised as a unit and the pick-up needle 5 is moved out of engagement with the gramophone record.

The tone arm is then swung outwardly clear of the edge of the played record and, after a new record has been placed upon the turntable or after the record just played has been removed from the turntable, the tone arm is again swung inwardly to a position with the pick-up needle 5 above the edge of the new record whereupon the rod 10 and the tone arm 4 are lowered. The teeth 18 do not prevent this lowering of the rod 10 because the tooth 17 of the plate 15 is now out of engagement with said teeth, as above described.

When during the lowering of the tone arm 4 the pick-up needle 5 engages the new record to be played the downward movement of the left hand end of the tone arm 4 ceases. The tone arm is then caused to turn clockwise about the axis 11 with respect to the rod 10 whereby the tooth 17 of the plate 15 will engage a tooth of the toothed portion 18 of the rod 10. When such engagement has been brought about the rod 10 is locked against further downward movement and the various parts of the mechanism have resumed the positions shown in Fig. 1 except that the rod 10 has been raised, or lowered, a distance corresponding to the thickness of a gramophone record depending upon whether a new record has been placed upon the pile 3 or the uppermost record of this pile has been removed. The angle between the pick-up needle 5 and the record to be played is unchanged, however.

The accuracy of the adjustment of the angle between the reproducing needle 5 and the record depends upon the distance between the successive teeth of the toothed portion 18 of the rod 10. The more close the teeth the greater the accuracy. A distance between successive teeth corresponding substantially to the thickness of a record should sufficient for all practical purposes.

Gramophone records are often warped necessitating a certain movability of the tone arm in vertical direction in order to prevent a varying pressure of the reproducing needle on the record.

In the position of the tone arm 4 shown in Fig. 1 the same is free to swing vertically about the axis 11 owing to a small clearance between the stop pin 25 and the rod 20. In order to obtain this clearance it is necessary, at the lowering of the rod 10 and the tone arm 4, for the locking tooth 17 to contact the toothed portion 18 intermediate two teeth.

Although this will probably always occur the following additional measures may be taken to assure a sufficient movability of the tone arm 4 in vertical direction.

The slots in the brackets 13 and 14 through which the plate 15 extends are dimensioned so as to present a slight clearance in vertical direction. Two blade springs are arranged to urge the plate 15 upwards so as to contact the upper surfaces of said slots. The strength of these blade springs is insufficient to raise the right hand end of the tone arm 4 but sufficient to hold the plate 15 in its upper position when not under the load of the tone arm 4.

The operation of this device is a follows. When the rod 10 and the tone arm 4 are lowered the plate 15 is held in its raised position by the blade springs. In this position the tooth 17 of the locking plate 15 is moved into engagement with the toothed portion 18. Upon further downward movement of the rod 10 the plate 15 is urged downwardly against the action of the blade springs and since substantially no angular displacement of the rod 10 with respect to the rod 20 can occur the tone arm 4 will turn clockwise about the axis 23 with respect to the rod 20 whereby the stop pin 25 is moved away from the rod 20 to assure sufficient movability of the tone arm 4 in vertical direction.

In this embodiment of the mechanism the distance between the successive teeth of the toothed portion 18 may be made very small so that a high accuracy is obtained as regards the adjustment of the angle between the pick-up needle 5 and the gramophone record.

The teeth 18 on the tone arm supporting rod 10 may be dispensed with and the locking member 15 arranged in such a manner that when the same is urged against the rod 10 the friction produced is sufficient to hold the rod 10 and the tone arm 4 in the position to which they have been moved. To this end the tooth 17 may be replaced by a self-locking friction device of some known type.

In the embodiment shown in Figs. 3 to 8 the base plate 28 is provided with a bore 29 in which a sleeve 30 is rotatably mounted. The sleeve 30 has a flange 31 and a lower threaded portion 32 carrying a nut which supports a cup-shaped ball race 34. Between the flange 31 and the base plate 28 and also between the latter and the ball race 34 rows of balls 35 (Fig. 4) are arranged which form the vertical bearing of the tone arm. In the sleeve 30 two channels 36 and 37 of rectangular cross-section are provided. Through the channel 36 a rod 38 extends. This rod is U-shaped in cross-section and is pivotally connected at its upper end to a bracket 39 secured to the tone arm 40. The rod 38 embraces two rolls 41 and 42 which are rotatably mounted in the sleeve 30 on pins 43 and 44, respectively. This arrangement has for its object to make the rod 38 slide easily in vertical direction in the channel 36. Also when in the elevated position of the rod the weight of the tone arm 40 tends to tilt the same.

Through the other channel 37 in the sleeve 30 a rod 45 (locking rod) extends. This rod 45 is provided with a toothed portion 46 adapted to cooperate with a sharp edge 47 (Figs. 4 and 7) which is formed on a plate 48, secured to the lower end of the sleeve 30. At its upper end the rod 45 is provided with a slot 49 (Figs. 3 and 4) through which extends a pin 50 which is secured to the bracket 39. A weak coiled tension spring 51 extends between the rod 45 and the bracket 39 and tends to turn the former counterclockwise (Fig. 4) about the pin 50 and also to move it downwardly.

A rather strong coiled tension spring 52 extends between the bracket 39 and the rod 38 and tends to turn the tone arm 40 counterclockwise (Fig. 4) with respect to the rod 38 so as to reduce the pressure with which the needle of a pick-up mounted on the right hand end of the tone arm 40 bears against the gramophone record.

The operation of this device is as follows.

When a record has been played the automatic record changing mechanism is caused to operate and elevates the tone arm supporting rod 38 by means of the cam disc 55, Fig. 9. During the first period of this upward movement of the rod 38 the pin 50 slides upwardly through the slot 49 in the rod 45 to the upper end of said slot, and since the pick-up needle remains by gravity upon the played record the tone arm 40 is turned clockwise (Fig. 4) with respect to the rod 38. This causes a pin 53 secured to the bracket 39 to engage the rod 45 whereupon also this rod is turned clockwise moving the teeth 46 out of engagement with the edge 47 of the plate 48. During the continued upward movement of the rod 38 another pin 54 secured to the bracket 39 will engage the rod 38 thus locking the tone arm 40 against further turning movement with respect to the said rod. As the rod 38 is further elevated the tone arm 40 is raised as a unit lifting the pick-up needle from the played record.

The tone arm should always be raised to such an extent that the reproducing needle will be at a level above the uppermost record of the highest pile of records which the turntable may receive. After the tone arm has been raised the same is swung outwardly clear of the edge of the played record whereupon a new record is placed upon the pile or the played record is removed therefrom. The tone arm is then swung inwardly so that the reproducing needle will be above the edge of the new record to be played. This swinging movement of the tone arm is brought about by turning the sleeve 30 on the balls 35 for which purpose the plate 48 is adapted to be actuated by a suitable mechanism not shown.

When the tone arm has been swung in over the new record the rod 38 together with the tone arm are lowered until the reproducing needle engages the record. During the continued lowering of the rod 38 the tone arm 40 is turned counterclockwise and the pin 54 is moved away from the rod 38 whereupon the pin 53 is also moved away from the rod 45 so that this latter rod is turned counterclockwise by the spring 51 until the toothed portion 46 engages the edge 47 of the plate 48 after which the rod 45 is locked against further movement. The rod 38 moves further downwardly until the pin 50 reaches the lower end of the slot 49. Simultaneously the pin 53 is moved away from the rod 45 to provide the necessary clearance.

It is to be understood that the details of the invention as herein disclosed are subject to alteration within the spirit or scope of the appended claims.

What I claim is:

1. In a record changing phonograph, a turntable adapted to carry a pile of records of variable height, a supporting member mounted for vertical sliding movement adjacent said turntable, a tone arm having one end rotatably connected to said supporting member so as to be swingable in a plane intersecting the plane of the turntable, a pick-up means carrying a reproducing needle mounted at the other end of said tone arm, means for raising said supporting member prior to change of a record, so as to raise the reproducing needle from the record just played and for lowering the supporting member when the record has been changed so as to move the needle into engagement with the new record to be played, a rod-shaped member rotatably connected to said tone arm and provided with a toothed portion, a fixed locking member adapted to cooperate with the toothed portion of said rod-shaped member, spring means for normally holding the rod-shaped member in a position in which the locking member engages a tooth of the toothed portion of the former, and an abutment member provided on said tone arm and adapted at the raising of the tone arm supporting member to engage said rod-shaped member and move the same out of engagement with the locking member and at the lowering of the tone arm supporting member to permit the spring means to move the rod-shaped member into engagement with the locking member after the pick-up means has engaged the record to be played and after the angle between the reproducing needle and the record has reached a predetermined value.

2. A record changing phonograph according to claim 1, in which the rod-shaped member is connected to the tone arm by a pin and slot connection permitting a relative sliding movement of the tone arm supporting member with respect to the rod-shaped member after the latter has been moved into engagement with the fixed locking member.

3. A record changing phonograph according to claim 1, in which the tone arm supporting member is in the form of a rod and in which a common sleeve is provided which is rotatably mounted and wherein said rod and the rod-shaped member cooperating with the fixed locking member are slidably mounted in vertical direction.

4. A record changing phonograph according to claim 1, in which a rotatable sleeve is provided in which the tone arm supporting member is in the form of a rod slidably mounted in vertical direction in the sleeve, and a plurality of rolls are provided in said sleeve upon which the tone arm supporting rod is adapted to slide.

5. A record changing phonograph according to claim 1, in which the tone arm supporting member is in the form of a rod of U-shaped cross-section, in which a rotatable sleeve is provided wherein said rod is slidably mounted in vertical direction, and wherein a plurality of rolls are provided rotatably mounted in said sleeve and adapted to engage the channel of the U-shaped supporting rod so as to guide the same.

ERIK WENNERBO.

REFERENCES CITED

The following references are of record in the file of this patent:

UNITED STATES PATENTS

| Number | Name | Date |
|---|---|---|
| 2,132,993 | Mitchell | Oct. 11, 1938 |
| 2,158,295 | Mitchell | May 16, 1939 |
| 2,230,003 | Mitchell | Jan. 28, 1941 |
| 2,246,130 | Forstrom | June 17, 1941 |
| 2,335,661 | Gay | Nov. 30, 1943 |